United States Patent
Reial

(10) Patent No.: US 7,382,292 B1
(45) Date of Patent: Jun. 3, 2008

(54) METHOD AND APPARATUS FOR EFFICIENT SIGNAL INTERPOLATION

(75) Inventor: Andres Reial, Lund (SE)

(73) Assignee: Telefonaktiebolaget LM Ericsson (publ) (SE)

(*) Notice: Subject to any disclaimer, the term of this patent is extended or adjusted under 35 U.S.C. 154(b) by 0 days.

(21) Appl. No.: 11/558,579

(22) Filed: Nov. 10, 2006

(51) Int. Cl.
*H03M 7/00* (2006.01)

(52) U.S. Cl. .................................................. 341/61

(58) Field of Classification Search ............. 341/61, 341/120, 122, 155, 123; 324/601, 74
See application file for complete search history.

(56) References Cited

U.S. PATENT DOCUMENTS

| 5,698,984 | A * | 12/1997 | Little et al. ............... 324/601 |
| 6,363,104 | B1 | 3/2002 | Bottomley |
| 6,570,918 | B1 * | 5/2003 | Rademacher ............... 375/232 |
| 2001/0036222 | A1 | 11/2001 | Doetsch et al. |
| 2002/0141482 | A1 | 10/2002 | Agami et al. |
| 2002/0191681 | A1 | 12/2002 | Akita et al. |
| 2003/0142726 | A1 | 7/2003 | Eltawil |
| 2003/0231703 | A1 | 12/2003 | Lugil |
| 2004/0120387 | A1 | 6/2004 | Bultan et al. |
| 2004/0127164 | A1 | 7/2004 | Mondragon-Torres et al. |
| 2004/0198450 | A1 | 10/2004 | Reilly et al. |
| 2005/0058184 | A1 * | 3/2005 | Paul et al. ................. 375/148 |
| 2005/0105647 | A1 | 5/2005 | Wilhelmsson et al. |
| 2005/0130616 | A1 | 6/2005 | Khayrallah et al. |

FOREIGN PATENT DOCUMENTS

EP 0876000 11/1998
EP 1638216 3/2006

OTHER PUBLICATIONS

Eltawil, A. et al. "A Low-Power DS-CDMA Rake Receiver Utilizing Resource Allocation Techniques." IEEE Journal of Solid-State Circuits, vol. 39, No. 8, 2004, pp. 1321-1330.
Soltanian, B. et al. "Complexity Analysis of an Interpolation Based Rake Receiver for WCDMA Systems." Proceedings of IEEE Global Communications Conference, vol. 6, pp. 3528-3532, Dec. 2001.
Holma, H. et al., Ed. "WCDMA for UMTS—Radio Access for Third Generation Mobile Communications." John Wiley & Sons, Ltd., West Sussex, England, 2000, pp. 30-34.

* cited by examiner

*Primary Examiner*—Brian Young
(74) *Attorney, Agent, or Firm*—Coats & Bennett, P.L.L.C.

(57) ABSTRACT

In one or more embodiments, an over-sampling method and corresponding over-sampling circuit efficiently generate an over-sampled signal by determining sampling phases in the over-sampled signal that are unused by downstream processing of the over-sampled signal, and skipping the generation of output values for the over-sampled signal that correspond to the unused sampling phases. In a communication receiver embodiment, determining the unused sampling phases comprises, with respect to currently estimated multipath delays of a received communication signal from which the over-sampled signal is derived, determining which sampling phases in the over-sampled signal will not be used by a downstream processing circuit having known processing delay assignment constraints. The known delay assignment constraints comprise Rake finger placement constraints or channel equalizer tap placement constraints, for example.

25 Claims, 4 Drawing Sheets

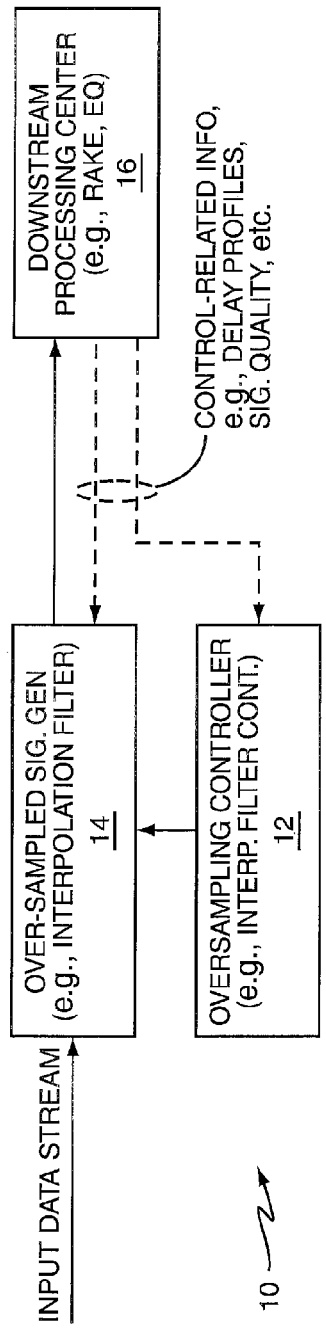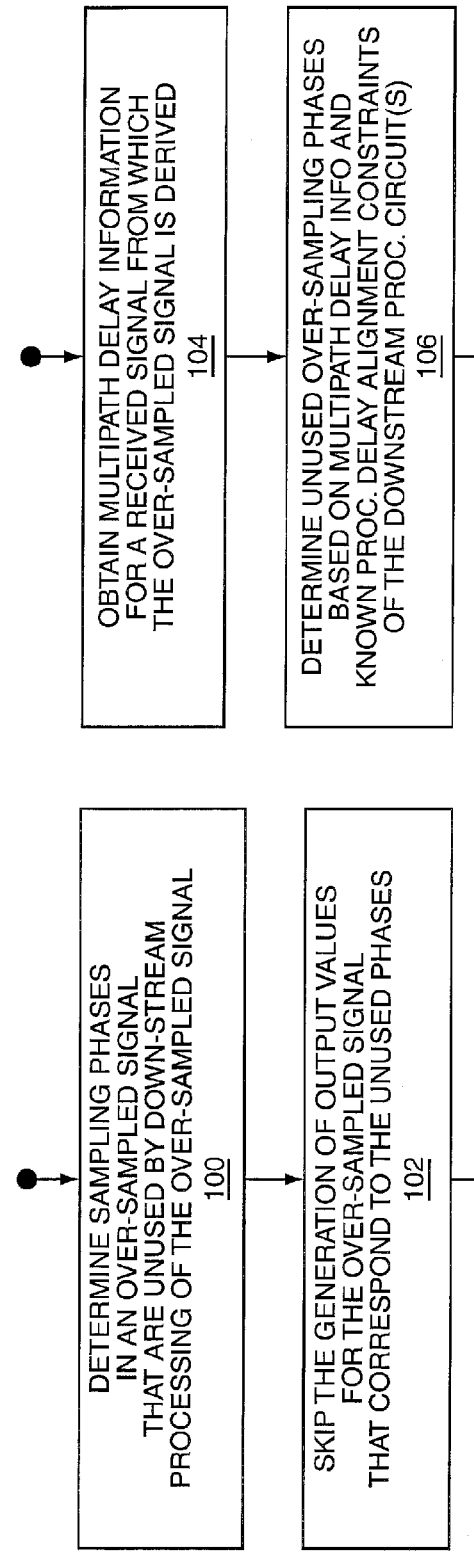

METHOD AND APPARATUS FOR EFFICIENT SIGNAL INTERPOLATION

BACKGROUND

The present invention generally relates to signal processing, and particularly relates to signal interpolation processing.

A typical digital communication receiver converts baseband received analog signals as output by its "front-end" circuits into a corresponding discrete-time sequence of quantized values. According to the fundamental Nyquist criterion, sampling the baseband analog signal at or above twice its highest frequency allows the resulting discrete-time sequence to model the analog baseband signal with no loss of information.

However, practical digital signal processing algorithms, such as filtering, etc., may be implemented more easily if the analog baseband signal is over-sampled, meaning that the sampling rate used to generate the discrete-time sequence is above the Nyquist rate. For example, in a Wideband CDMA (WCMDA) signal processing context, the actual minimum sample rate equals 1.22 samples per "chip," which translates into one discrete-time sample per 0.82 chips in the received signal. One sample per ¾ chips, however, offers a more practical, "digital friendly" minimum sampling reference given digital processing implementation considerations. With that minimum, receiver over-sampling rates include 2× over-sampling ("OS2") at one sample per ½ chip, or 4× over-sampling ("OS4") at one sample per ¼ chip.

Receiver architecture and operation at least partially determines the preferred over-sampling parameters. Consider, for example, Rake receiver structures, which represent a common receiver design in WCDMA systems. A Rake receiver despreads and combines multipath copies of a received signal to maximally utilize the signal energy available to the receiver. In a simplified model, each despreading "finger" in a Rake receiver processes a copy of the transmit signal corresponding to one radio propagation path, based on correlating the received signal—represented by a sampled discrete-time sequence—with an appropriately delayed reference spreading sequence. The Rake receiver then sums the correlation results (despread values) from each finger using a set of combining weights.

As a simplification, one may assume that the delay spacing of individual Rake fingers follows the Nyquist minimum and in a "practical" WCDMA Rake receiver application, a minimum distance of ¾ chips represents a convenient choice for minimum finger placement. With that minimum separation and assuming non-grid based finger placement, fingers may end up at any delay that is a ¼ chip multiple. With grid-based finger placement, where fingers are placed to cover regions of signal energy instead by being placed to match individual physical path delays, the finger delays fall at ¾ chip multiples.

Nonetheless, samples corresponding to the ¼ chip spacing must be produced to allow for the ¾ chip minimum spacing. One approach to obtaining the desired OS4 samples comprises up-sampling an OS2 sequence (inserting zeros for every second sample of the OS2 sequence) and applying a Finite Impulse Response (FIR) filter, consisting of a predetermined number of filter taps, at the OS4 rate. While the resulting OS4 sequence contains no additional information compared to the OS2 sequence, it does permit use of simple Rake structures to effect optimal demodulation of the received symbol sequence.

However, those skilled in the art will appreciate that, when grid-based finger placement is used, not all samples corresponding to all multiples of ¼ chips are necessarily used during despreading. Interpolating the OS2 sequence to obtain these ultimately unused samples represents needless processing overhead and is a waste of receiver power. Of course, the same issue arises with other grid spacing/phase parameters, and in non-grid placement as well.

Similar issues arise in chip equalizer and other fractionally spaced equalizer structures. Channel equalizers use knowledge of multipath channel characteristics (path delays and coefficients) to compensate for the loss of code orthogonality in a received CDMA caused by Inter-Symbol-Interference (ISI). However, not all delays are used for a given (tap) delay resolution. Knowing how the propagation channel taps are spaced, which is learned from channel estimation processing, allows the receiver to pick a reduced number of equalizer channel taps for equalization processing. That is, one can formulate a reduced-tap channel equalizer for certain multipath channel realizations, and these reduced-count taps correspond only to a limited subset of samples from the over-sampled baseband signal. For example, assume possible channel equalization taps at (1, 1.25, 1.5, 1.75, 2.0, 2.25, . . . ) and a 4× over-sampled signal having phases (0, 1, 2, and 3). Further, assume that for current channel conditions, the equalizer taps at x.25 are not used ("x" equals 1, 2, . . . ). In this case, the "phase 1" samples in the over-sampled signal are unneeded and their computation in an interpolation filter represents wasted receiver processing.

More generally, many over-sampled signal generation applications include delay-based processing, wherein over-sampled signal samples corresponding to certain processing delays are used and other samples corresponding to other processing delays are not. Generating output values represents wasted receiver processing to the extent that the output values correspond to delays not of interest for subsequent processing of the over-sampled signal.

SUMMARY

In signal over-sampling applications, generating output values in an over-sampled signal that are not used in downstream processing of the over-sampled signal represents a waste of receiver power and computational cycles. Accordingly, one or more circuits and corresponding method embodiments taught herein implement dynamic adaptation of an over-sampling process based on changes in the processing delays of interest.

As an example, in one or more embodiments taught herein, an over-sampling circuit in a wireless communication apparatus adapts its functioning according to which particular over-sampled values are required by downstream processing of the over-sampled signal, e.g., Rake receiver or chip equalizer processing. For interpolation-based over-sampling, such operation intelligently reduces interpolation filter response length, while optimizing filter performance at the reduced length.

Broadly, according to a method and corresponding circuit implementation taught herein, an adaptive interpolation process adapts the set of over-sampling operations executed by the process according to the delay values that are of interest with respect to downstream signal processing. More particularly, the adaptive interpolation process skips the generation of output values in the over-sampled stream that correspond to unused processing delays, thereby increasing efficiency of the over-sampling process.

In at least one embodiment, a method of efficiently generating an over-sampled signal comprises determining sampling phases in the over-sampled signal that are unused by downstream processing of the over-sampled signal, and skipping the generation of output values for the over-sampled signal that corresponds to the unused sampling phases. Further efficiency is gained in at least one such embodiment by skipping the generation of output values for the over-sampled signal that are already present in an input data stream from which the over-sampled signal is derived.

In at least one embodiment of the above method, determining sampling phases in the over-sampled signal that are unused by downstream processing of the over-sampled signal comprises, with respect to currently estimated multipath delays of a received communication signal from which the over-sampled signal is derived, determining which sampling phases in the over-sampled signal will not be used by a downstream processing circuit having known processing delay assignment constraints. The downstream processing circuit comprises, for example, a Rake receiver having constrained Rake finger placements, or a channel equalizer circuit having constrained channel equalization filter tap placements.

The method may be implemented in an over-sampling circuit comprising an over-sampling controller that identifies the unused sampling phases, and an over-sampled signal generator operatively controlled by the over-sampling controller such that it skips the generation of output values for the unused phases. Thus, one embodiment of a corresponding wireless communication apparatus comprises an over-sampled signal generator configured to generate an over-sampled signal from input data samples derived from a received signal, a received signal processing circuit configured to process the over-sampled signal at defined processing delay alignments, and an over-sampling controller. The over-sampling controller is configured to identify sampling phases of the interpolation signal that are not used by the received signal processing circuit, and to control the over-sampled signal generator filter to skip the generation of output values in the over-sampled signal that correspond to the unused sampling phases. The wireless communication apparatus may comprise all or part of a mobile terminal, such as a mobile communication terminal for use in a Wideband Code Division Multiple Access (WCDMA) or other type of wireless communication network.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a block diagram of one embodiment of an over-sampling circuit, shown in context with downstream processing circuits.

FIG. 2 is a logic flow diagram of one embodiment of over-sampling processing logic that may be implemented in the over-sampling circuit of FIG. 1, for example.

FIG. 3 is a logic flow diagram of one embodiment of processing logic to determine unused sample phases in the over-sampled signal generated by the processing logic of FIG. 2, for example.

DETAILED DESCRIPTION

Figure 4:
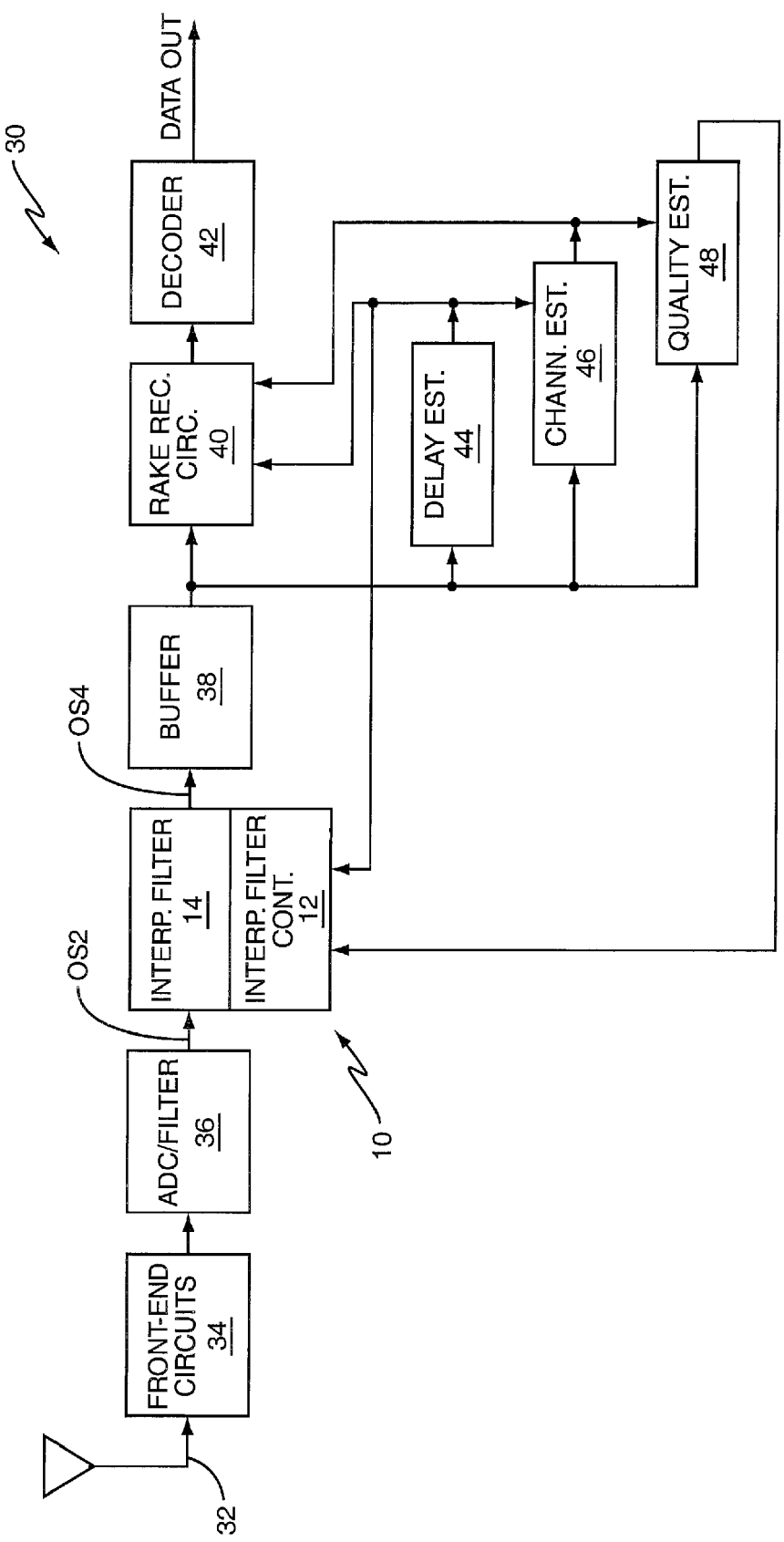
FIGS. 4 and 5 are block diagrams of different embodiments of a wireless communication apparatus that includes an embodiment of the over-sampling circuit illustrated in FIG. 1, for example.

FIG. 1 illustrates an over-sampling circuit 10 that comprises an over-sampling controller 12 and further comprises, or is associated with, an over-sampled signal generator 14. In operation, the over-sampled signal generator 14 generates an over-sampled signal responsive to control by the over-sampling controller 12, and a downstream processing circuit 16 processes the over-sampled signal.

FIG. 2 illustrates processing logic implementing one embodiment of over-sampling processing implemented by the over-sampling circuit 10. Such processing may be implemented in hardware, software, or any combination thereof, and while the processing suggests sequential operations, it should be understood that at least some processing actions may be performed concurrently, and that the illustrated processing may comprise only a portion of a larger processing operation.

With that in mind, the processing of FIG. 2 begins with the over-sampling controller 12 determining sampling phases in the over-sampled signal (output by the over-sampled signal generator 14) that are not used by downstream processing of the over-sampled signal (Step 100). Processing continues with the over-sampling controller 12 configuring the over-sampled signal generator 14 to skip the generation of output values for the over-sampled signal that correspond to the unused phases (Step 102).

As will be explained in more detail later herein, the over-sampled signal generator 14 may derive the over-sampled signal from an input data stream that comprises samples of a wirelessly received signal. In this context, the unused sample phases, also referred to as the "sample phases not of interest," depend on signal processing delay alignment constraints and the current multipath delays of the received signal. FIG. 3 broadly illustrates corresponding processing, which begins with obtaining multipath delay information for the received signal (Step 104), such as represented by a Power Delay Profile. Processing continues with determining the unused sampling phases based on the multipath delay information and the (known) processing delay alignment constraints of the downstream processing circuit 16, which may comprise a Rake receiver or channel equalization circuit in such applications (Step 106).

FIG. 4 sets forth the communication signal processing application context in more detail by illustrating one embodiment of a wireless communication apparatus 30 that includes an embodiment of the over-sampling circuit 10. The illustrated wireless communication apparatus 30 includes an embodiment of the over-sampling circuit 10 and further comprises an antenna 32, front-end circuits 34, Analog-to-Digital-Converter (ADC)/filter circuits 36, a buffer 38, a Rake receiver circuit 40, a decoder 42, and delay estimator 44, a channel estimator 46, and a (signal) quality estimator 48.

Those skilled in the art will recognize that FIG. 4 presents a non-limiting functional circuit arrangement, and that, in the communication signal processing context, the over-sampling circuit 10 may be included in wireless communication apparatuses having other circuit arrangements. For example, while transmit-related circuits are not illustrated, such circuits may be included in the wireless communication apparatus, such as where the wireless communication apparatus 30 comprises a mobile terminal, PDA, laptop/palmtop computer or communication card therein, or other such two-way communication device. In at least one embodiment contemplated herein, the communication apparatus 30 comprises a mobile or base station transceiver configured for use in a wireless communication network based on the WCDMA standards, for example.

Additionally, those skilled in the art should appreciate that the illustrated circuit arrangement may represent "functional" circuit elements, rather than a physical circuit implementation. For example, the wireless communication apparatus 30 may include a baseband processor having significant dedicated or programmable digital signal processing resources which are configured to carry out some or all digital baseband processing. As such, all or a portion of the Rake receiver circuit 40, delay estimation circuit 44, channel estimation circuit 46, and quality estimation circuit 48 may be implemented within one or more such baseband processors via hardware, software, or any combination thereof. Similarly, all or a portion of the over-sampling circuit 10 may be implemented in a baseband processor.

With the above qualifications in mind, operation of the illustrated wireless communication apparatus 30 is as follows. The front-end circuits 34 provide analog filtering, amplification, and down-conversion as needed, for antenna-received signals impinging on the antenna 32, e.g., a received WCDMA communication signal with a chip rate of 3.84 Mcps and excess bandwidth of 0.22 assumed. In turn, the ADC/filter circuits 36 produce a discrete time sequence of values—a data stream—corresponding to the baseband analog signal output by the front-end circuits 34. Taken at twice the chip rate, the over-sampled data stream output by the ADC/filter circuits 36 is referred to as OS2 data.

As such, the OS2 data serves as the input data stream for the over-sampling circuit 10. Here, the over-sampled signal generator 14 is configured as an interpolation filter and the over-sampling controller 12 is correspondingly configured as an interpolation filter controller. The over-sampled signal generator 14 therefore generates its output over-sampled signal via interpolation processing of the input OS2 data stream and, according to the teachings herein, is configured by the over-sampling controller 12 to skip a generation, i.e., to omit interpolation processing, for output values of the over-sampled signal corresponding to sampling phases unused by the Rake receiver circuit 40.

If configured for two-times over-sampling, the over-sampled signal generator 14 up-samples the OS2 signal into an OS4 signal. That is, in the illustrated example, the over-sampled signal generator 14 over-samples the input OS2 signal by a factor of two, and thereby generates an OS4 signal as its output. In the context of over-sampling from OS2 to OS4, one may denote the input OS2 signal as $x_k$ and the copy of it, up-sampled to OS4, by $y_l$, $$y_l = \begin{cases} x_{l/2}, & l \text{ is even} \\ 0, & l \text{ is odd} \end{cases} \quad \text{Eq. (1)}$$

Let the target OS4 signal be $z_l$, produced by convolving the up-sampled signal $y_l$ with an interpolation filter $h_i$ implemented by the over-sampled signal generator 14:

$$z_l = \sum_{i=-N_l}^{N_l} y_{l-i} h_i. \quad \text{Eq. (2)}$$

In this general model, the filter $h_i$ is real and has a total of $2N_1+1$ taps. The number of actual correlation sums may be reduced from the start by imposing a suitable filter design. By requiring that $h_i=0$ for $i=\pm 2, \pm 4, \ldots$ (filter impulse response equals zero at indices that are integer multiples of the oversampling ratio) and that $$\sum_{i \neq 0} h_i = 1,$$

one guarantees $z_l=y_l$ for all even l. In other words, half of the interpolation operations may be omitted right away. As a general point of efficiency, the over-sampled signal generator 14 may be configured to skip the generation of output values for the over-sampled signal that is already present in an input data stream from which the over-sampled signal is derived.

In determining which sample phases, denoted by sample indices l, are of practical interest, delay estimation may be performed on the OS2 data. In this procedure, for example, the delay estimation circuit 44 calculates a Power Delay Profile (PDP) from the OS2 signal. In turn, the over-sampling controller 12 converts the OS2 PDP to the OS4 time scale, e.g., by interpolation, and thereby produces a "listing" of possible Rake finger delay placements on the OS4 time scale. (Of course, in another embodiment, PDP processing may be performed in some other processing element.) One may denote these delays as $d_n$. Two further comments apply to such processing. First, the OS2 data allows the production of good quality delay estimates—i.e., all information is present in the signal. Second, interpolation of the PDP is a relatively low-complexity operation, and generally needs be performed no more frequently than required for PDP updating to track changing propagation channel conditions.

The over-sampling controller 12 determines the OS4 sampling phases of interest to the downstream Rake-based processing from the list of finger delays. Viewed another way, the over-sampling controller 12 determines the sampling phases in the OS4 signal produced by the over-sampled signal generator 14 that are unused by Rake receiver circuit 40. More broadly, for a variety of downstream processing scenarios, the over-sampling controller 12 determines, with respect to currently estimated multipath delays of the received signal, sampling phases in the over-sampled signal generated by the over-sampled signal generator 14 that are unused by related downstream processing, based on known processing delay assignment constraints associated with the downstream processing.

In examining processing delay constraints for the illustrated example, one may observe the delays of the different Rake fingers, modulo chip period (4 samples for OS4), $p_n=d_n \bmod 4$. The set of sampling phases P that must be available in the OS4 signal provided to the Rake receiver circuit 40 for despreading are then given as $P=\cup_n p_n$. For certain Rake finger configurations, some phases will not be present in the list P. In such cases, e.g., if OS4 sample phases 1 and/or 3 will not be used in data despreading, the oversampling controller 12 configures the over-sampled signal generator 14 to skip interpolation operations for those unused phases. In other words, the over-sampled signal generator 14 skips the generation of output values corresponding to the unused sampling phases.

As an example, assume a ¾ chip fixed grid finger placement is used, but further assume that only a few Rake fingers in the Rake receiver circuit 40 are used to despread the OS4 signal from the over-sampled signal generator 14. In that case, the Rake receiver circuit 40 may not use output values in the OS4 signal corresponding to all sampling phases. That is, some of the OS4 signal samples are not needed by the Rake receiver circuit 40, and the over-sampling controller 12 recognizes this condition and configures the over-sampled signal generator 14 to skip interpolation of output values corresponding to the unused sampling phases.

In another example, assume a 1-chip-spaced fixed grid is used as a processing delay alignment constraint for the Rake receiver circuit 40. In that case, if the Rake finger phases are even in the OS4 scale, the OS4 values needed by the Rake receiver circuit 40 are already available from the OS2 signal. As such, the over-sampled signal generator 14 may be configured to skip the generation of those values in the over-sampled output signal already present in its input signal, i.e., skip all interpolation processing.

In terms of configuring the over-sampled signal generator 14 to skip output value generation for unused sampling phases and/or to avoid the generation of values already present in its input signal, it should be understood that, in common wireless communication processing applications, the delay estimating circuit 44 is activated "relatively" infrequently. Similarly, the Rake finger positions in the Rake receiver circuit 40 are changed relatively infrequently. As such, setting up the over-sampled signal generator 14 to control for which sampling phases output values are generated generally need not be done on an overly frequent basis. For example, the configuration of the over-sampled signal generator 14 may be updated once per several frames of the received communication signal.

However, it should be understood that the teachings herein also contemplate embodiments wherein the Rake active finger selection decision, or a "Generalized" Rake finger subset combining decision, is used to dynamically steer the over-sampling configuration of the over-sampled signal generator 14. Such decisions, and corresponding configuration updates of the over-sampled signal generator 14 by the over-sampling controller 12, may occur much more frequently than once every several frames, e.g., on a once-per-slot basis, assuming multi-slot frames of the received signal. Note that a Generalized Rake receiver places a relatively large number of fingers within the delay profile of the received signal, and combines a smaller subset of those fingers to maximize the collection of desired signal energy, while suppressing colored interference.

Figure 5:
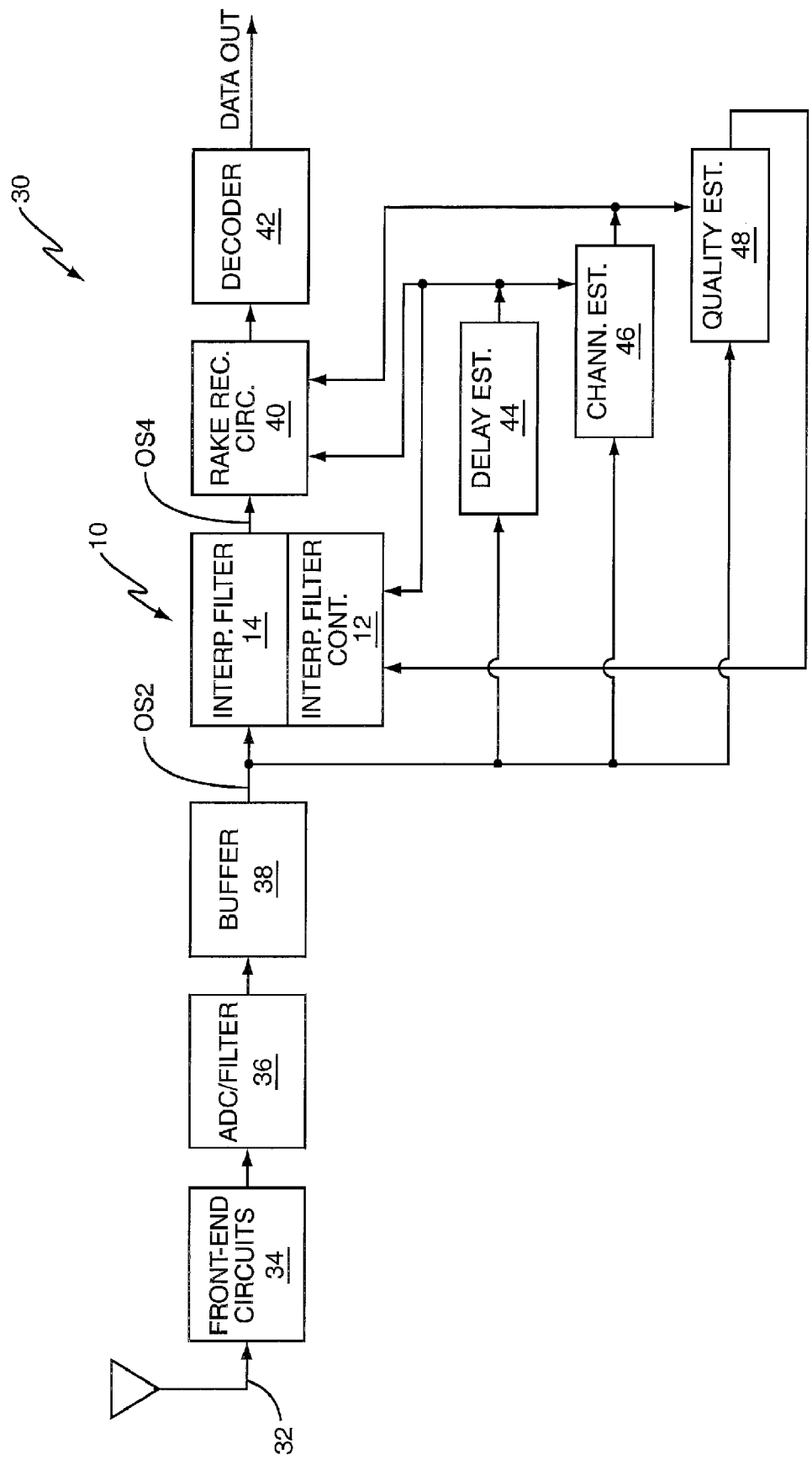

Turning to FIG. 5, one sees another embodiment of the wireless communication apparatus 30. Here, the buffer circuit 38 resides in advance of the over-sampling circuit 10 and thereby provides the over-sampling circuit 10 with buffered samples derived from the received signal, i.e., with a buffered OS2 signal. In contrast, the embodiment illustrated in FIG. 4 buffered the over-sampled signal output by the over-sampling circuit 10, i.e., the OS4 signal was held in the buffer 38. In that context, the Rake receiver circuit 40 used the buffered OS4 signal to despread and combine the desired CDMA code channel(s) included in the received signal.

As such, the over-sampling occurs once, for each buffer's worth of data. Even so, configuring the over-sampled signal generator 14 to skip its generation of output values in the over-sampled signal that are not needed by the downstream processing increases operating efficiency by omitting needless computational operations. However, in the embodiment of FIG. 5, reducing the complexity of over-sampling to a minimum offers considerably more significant impact on processing efficiency and, ultimately, the power consumption of the wireless communication apparatus 30.

More particularly, in the illustrated configuration, the OS2 signal rather than the OS4 signal is buffered. Assuming duplication in output values of the OS4 signal with input values in the OS2 signal, the required size of the buffer 38 may be reduced by up to half. More significantly, the over-sampling circuit 10 is configured to interpolate the buffered OS2 signal on the fly, such that an OS4 signal is provided to the Rake receiver circuit 40 once per (code) channel of interest in the received signal. (On the fly interpolation is performed as needed.) In this manner, the efficiency gained by intelligently skipping the generation of unneeded output values in the OS4 signal is multiplied by the number of individual code channels that are despread.

Of course, the above examples were cast in the context of a Rake receiver embodiment, but the interpolation processing benefits apply to a wide variety of downstream processing circuits, such as channel equalization circuits. Much like a Generalized Rake receiver, a channel equalizer uses filter taps to combine differently delayed versions of the received signal using tap combining weights that maximize signal quality by compensating for channel distortion and colored interference. By knowing the delay alignment constraints, i.e., the filter tap delay placement constraints, of the channel equalizer, and with respect to the currently estimated multipath delays of the received signal, the over-sampling controller 12 can determine the sampling phases of the over-sampled signal generated by the over-sampled signal generator 14 that are not used for channel equalization.

Figure 6:
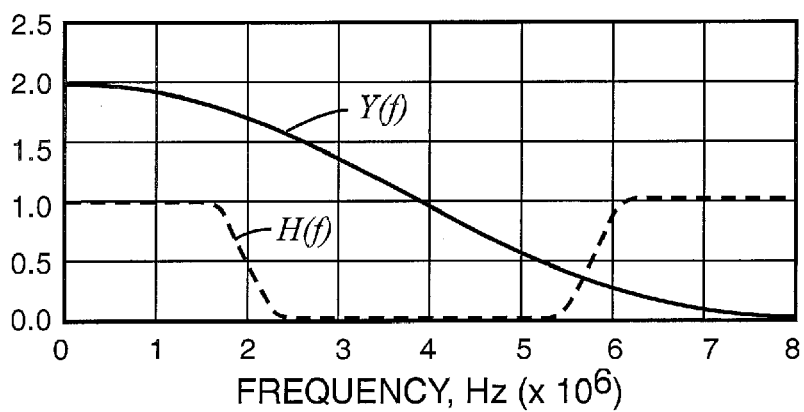
FIGS. 6-8 are graphs of signal spectra associated with one embodiment of interpolation filter design, as may be used for interpolation-based signal over-sampling.

Turning to implementation details for one or more embodiments of over-sampling processing by the over-sampled signal generator 14, one notes that the over-sampled signal $y_i$ has a spectrum denoted as Y(f). Assuming the same OS2-to-OS4 over-sampling of a received WCDMA communication signal, FIG. 6 depicts the spectrum of Y(f). One goal of interpolation-based over-sampling is the suppression of the high-frequency half of the spectrum.

Figure 7:
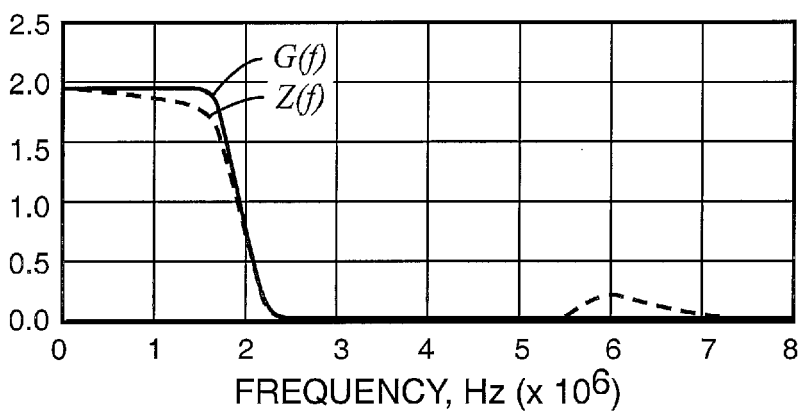

With ideal suppression of that high-frequency half, one obtains the OS4 signal spectrum G(f) depicted in FIG. 7. The desired spectrum will result from any interpolation filter having a gain of one over the pass band of Y(f) and a gain of zero over the stop band. The constraints on $h_i$ above also dictate that the filter have a so-called Nyquist response, i.e. a 180 degree rotational symmetry about the point. (For the WCDMA signal example, this means f=3.84 MHz, gain=1.0.) One example of such a filter is an RC filter with a suitable excess bandwidth, but those skilled in the art will appreciate that any practical (finite) approximation of such a filter will introduce some distortion in the frequency domain.

Thus, in interpolation filter embodiments of the over-sampled signal generator 14, the interpolation filter may be configured to have finite filter length, wherein the filter tap coefficients are determined by minimizing a cost function that optimizes the desired filter response. For example, one may choose the cost function to be the squared error of the interpolated frequency response Z(f)=(Y(f)H(f):

$$C = \int |Z(f) - G(f)|^2 df \qquad \text{Eq. (3)}$$

Figure 8:
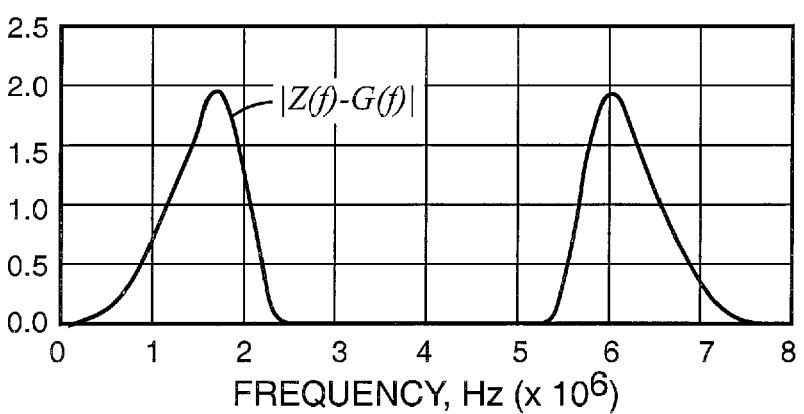

FIG. 8 illustrates the absolute value of Z(f)–G(f).

Given the constraints above, the design process seeks a filter of the form h=[ . . . , 0, $h_3$, 0, $h_1$, 0, 1, $h_1$, 0, $h_3$, 0, . . . ]. A constrained minimization of the cost function yields the values for the desired FIR filter. Here, the coefficients $h_3$, $h_5$, etc. are free variables, and the first coefficient $h_1$ is constrained so that 2.

$$\sum_{i=1,3,5,\ldots} h_i = 1, \text{ i.e. } h_i = 0.5 - \sum_{i=3,5,\ldots} h_i.$$

Prior to the minimization process, the coefficients $h_i$ may be initialized to the corresponding truncated RC filter coefficients. Using this method, interpolation filters having a long "effective" length but a reasonable number of actual taps may be designed by using a small number of free parameters, e.g. the length-7 filter version has only one free variable.

Of course, filter length relates to filter distortion performance and zero distortion impractically equates to infinite filter length. In context with the above numerical values, the simplest length-3 filter (2 multiply-and-accumulates (MACs) per output OS4 sample to implement, no free variables) causes a distortion of about –10.6 dB, whereas a length-7 filter (4 MACs per output sample, 1 free variable) –19.7 dB, and the length-11 filter (6 MACs per output sample, 2 free variables) –27.4 dB.

Although the above filter response optimization example refers to the specific case of interpolating a WCDMA signal from OS2 to OS4 (2× interpolation), those skilled in the art will appreciate immediately that analogous procedures apply to other cases, such as for OS2 to OS8 (4× interpolation). Broadly, the optimization approach applies anywhere the filter construction constraint generalizes to the filter response equaling zero at the indices that are integer multiples of the interpolation ratio.

Irrespective of whether the above filter response optimization teachings are applied to the over-sampled signal generator 14, it may be noted that when operating at low signal qualities the added signal degradation caused by filter distortion may be negligible compared to the received interference component. Thus, a low-order, and a lower-quality interpolation filter may be applied, thus saving additional power. Therefore, one teaching herein is that the over-sampling controller 12 may be configured to adapt the effective length of the interpolation filter in the over-sampled signal generator 14 as a function of signal quality.

In one or more embodiments, the over-sampled signal generator 14 is implemented as an interpolation filter having a programmable or otherwise configurable number of active taps. With that configuration, the over-sampling controller 12 receives signal quality information, e.g., a signal-to-noise and interference ratio (SINR), from the quality estimation circuit 48 and, in turn, adjusts the interpolation filter length of the over-sampled signal generator 14. More particularly, the over-sampling controller 12 increases the interpolation filter length used by the over-sampled signal generator 14 for higher signal qualities and reduces it for lower signal qualities.

With the above in mind, the teachings herein disclose a method and corresponding circuit that efficiently generate an over-sampled signal by determining sampling phases in the over-sampled signal that are unused by downstream processing of the over-sampled signal, and skipping the generation of output values for the over-sampled signal that corresponds to the unused sampling phases. In communication receiver applications, the over-sampled signal may be derived from received communication signal samples, and the unused phases may be determined by known processing delay assignment constraints associated with downstream processing of the over-sampled signal, with respect to the currently estimated multipath delays of the received signal. Of course, those teachings serve as a non-limiting example of efficient signal over-sampling as taught herein.

As such, the present invention is not limited by the foregoing description and accompanying drawings. Instead, the present invention is limited only by the claims and their legal equivalents.

What is claimed is:

1. A method of efficiently generating an over-sampled signal comprising:
   receiving a first over-sampled signal;
   up-sampling the first over-sampled signal to generate a second over-sampled signal;
   determining sampling phases in the second over-sampled signal that are unused by downstream processing of the second over-sampled signal; and
   skipping the generation of output values for the second over-sampled signal that correspond to the unused sampling phases.

2. The method of claim 1, further comprising skipping the generation of output values for the second over-sampled signal that are already present in the first over-sampled signal.

3. The method of claim 1, further comprising controlling a filter length of an interpolation filter used to generate the second over-sampled signal as a function of a signal quality estimate associated with the first over-sampled signal.

4. The method of claim 1, further calculating filter tap coefficients for an interpolation filter used to generate the second over-sampled signal based on a cost-minimization function that optimizes a desired response of the interpolation filter.

5. The method of claim 1, wherein determining sampling phases in the second over-sampled signal that are unused by downstream processing of the second over-sampled signal comprises, with respect to currently estimated multipath delays of a received communication signal from which the first over-sampled signal is derived, determining which sampling phases in the second over-sampled signal will not be used by a downstream processing circuit having known processing delay assignment constraints.

6. The method of claim 5, wherein determining which sampling phases in the second over-sampled signal will not be used by a downstream processing circuit having known processing delay assignment constraints comprises, for a downstream Rake receiver circuit, determining which sampling phases in the second over-sampled signal correspond to unused Rake finger placements.

7. The method of claim 5, wherein determining which sampling phases in the second over-sampled signal will not be used by a downstream processing circuit having known processing delay assignment constraints comprises, for a downstream channel equalization circuit, determining which sampling phases in the second over-sampled signal correspond to unused channel equalization filter tap placements.

8. The method of claim 5, further comprising updating the determination of unused sampling phases responsive to updates of the currently estimated multipath delays of the received communication signal.

9. The method of claim 1, wherein the second over-sampled signal is derived from samples of a received Wideband Code Division Multiple Access (WCDMA).

10. The method of claim 9, further comprising buffering the samples of the received WCDMA signal and generating the second over-sampled signal on an as-needed basis using the buffered samples.

11. An over-sampling circuit for efficiently generating a second over-sampled signal by up-sampling a first over-sampled signal, said over-sampling circuit comprising one or more processing circuits configured to:
   determine sampling phases in the second over-sampled signal that are unused by downstream processing of the second over-sampled signal; and
   skip the generation of output values for the second over-sampled signal that correspond to the unused sampling phases.

12. The interpolation circuit of claim 11, wherein the one or more processing circuits comprise an over-sampling controller configured to determine the unused sampling phases, and an over-sampled signal generator operatively controlled by the over-sampling controller to skip the generation of output values for the second over-sampled signal that correspond to the unused sampling phases.

13. The interpolation circuit of claim 12, further comprising a downstream processing circuit configured to process the second over-sampled signal, and communicatively coupled to at least one of the over-sampling controller and the over-sampled signal generator.

14. The interpolation circuit of claim 12, wherein the over-sampling controller comprises an interpolation filter controller and the over-sampled signal generator comprises an interpolation filter.

15. The interpolation circuit of claim 11 wherein the one or more processing circuits are configured to skip the interpolation of output values for the second over-sampled signal that are already present in the first over-sampled signal.

16. The interpolation circuit of claim 11, wherein the one or more processing circuits are configured to control a filter length of an interpolation filter used to generate the second over-sampled signal as a function of a signal quality estimate associated with the first over-sampled signal.

17. The interpolation circuit of claim 11, wherein the one or more processing circuits are configured to calculate filter tap coefficients for an interpolation filter used to generate the second over-sampled signal based on a cost-minimization function that optimizes a desired response of the interpolation filter.

18. The interpolation circuit of claim 11, wherein the one or more processing circuits are configured to determine sampling phases in the second over-sampled signal that are unused by downstream processing of the second over-sampled signal based on currently estimated multipath delays of a received communication signal from which the first over-sampled signal is derived and known processing delay assignment constraints associated with a downstream processing circuit configured to process the second over-sampled signal.

19. The interpolation circuit of claim 18, wherein the downstream processing circuit comprises a Rake receiver circuit that includes or is associated with the interpolation circuit, and wherein the interpolation circuit determines which sampling phases in the second over-sampled signal correspond to unused Rake finger placements.

20. The interpolation circuit of claim 18, wherein the downstream processing circuit comprises a channel equalization circuit that includes or is associated with the interpolation circuit, and wherein the interpolation circuit determines which sampling phases in the second over-sampled signal correspond to unused channel equalization filter tap placements.

21. The interpolation circuit of claim 18, wherein the one or more processing circuits are configured to update the determination of unused sampling phases responsive to an updating of the currently estimated multipath delays of the received communication signal.

22. The interpolation circuit of claim 11, wherein the first over-sampled signal comprises samples of a received Wideband Code Division Multiple Access (WCDMA) signal, and wherein the interpolation circuit includes or is associated with a buffer for buffering the samples and is configured to generate the second over-sampled signal on an as-needed basis using the buffered samples.

23. A wireless communication apparatus including the over-sampling circuit of claim 11.

24. A wireless communication apparatus comprising:
   an over-sampled signal generator configured to generate a second over-sampled signal by up-converting a first over-sampled signal derived from a received signal;
   a received signal processing circuit configured to process the second over-sampled signal at defined processing delay alignments; and
   an over-sampling controller configured to identify sampling phases of the second over-sampled signal that are not used by the received signal processing circuit, and to control the over-sampled signal generator filter to skip the generation of output values in the second over-sampled signal that correspond to the unused sampling phases.

25. The method of claim 1, further comprising controlling a filter length of an interpolation filter used to generate the second over-sampled signal as a function of a signal quality estimate associated with the second over-sampled signal.

* * * * *